US005861549A

United States Patent [19]
Neukermans et al.

[11] Patent Number: 5,861,549
[45] Date of Patent: Jan. 19, 1999

[54] INTEGRATED SILICON PROFILOMETER AND AFM HEAD

[75] Inventors: Armand P. Neukermans, Palo Alto; Timothy G. Slater, San Francisco, both of Calif.

[73] Assignee: XROS, Inc., Mountain View, Calif.

[21] Appl. No.: 762,589

[22] Filed: Dec. 10, 1996

[51] Int. Cl.⁶ ........................................................ G01B 7/34
[52] U.S. Cl. ............................... 73/105; 269/57; 310/333
[58] Field of Search ............................... 73/105; 269/57, 269/71; 310/333; 318/638; 250/306, 307

[56] References Cited

U.S. PATENT DOCUMENTS

| 4,317,611 | 3/1982 | Petersen | 350/6.6 |
|---|---|---|---|
| 4,468,282 | 8/1984 | Neukermans | 156/633 |
| 4,506,154 | 3/1985 | Scire | 250/442.1 |
| 4,598,585 | 7/1986 | Boxenhorn | 73/505 |
| 4,670,092 | 6/1987 | Motamedi | 156/643 |

(List continued on next page.)

OTHER PUBLICATIONS

Stephen A. Joyce, et al., A New Force Sensor Incorporating Force–Feedback Control for Interfacial Force Microscopy, Review of Scientific Instruments vo. 62, No. 3, Mar. 1991, pp. 710–715.

Boxenhorn, B., et al., "Monolithic Silicon Accelerometer," *Sensors and Actuators*, A21–A23 (1990) pp. 273–277.

Breng, U., et al., "Electrostatic Micromechanic Actuators," *Journal of Micromechanics and Microengineering*, 2 (1992) pp. 256–261.

Buser, R.A., et al., "Very High Q–factor Resonators in Monocrystalline Silicon," *Sensors and Actuators*, A21–A23 (1990) pp. 323–327.

Diem, B., et al., "SOI (SIMOX) as a Substrate For Surface Micromachining of Single Crystalline Silicon Sensors and Actuators," *The 7th International Conference on Solid–State Sensors and Actuators*, (1993) pp. 233–236.

Jaecklin, V.P., et al., "Mechanical and Optical Properties of Surface Micromachined Torsional Mirrors in Silicon, Polysilicon and Aluminum", *The 7th International Conference on Solid–State Sensors and Actuators*, (1993) pp. 958–961.

Kleiman, R.N., et al., "Single–Crystal Silicon High–Q Torsional Oscillators," *Rev. Sci. Instum.* 56(11), Nov. 1985, pp. 2088–2091.

Pfann, W.G., et al., "Semiconducting Stress Transducers Utilizing the Transverse and Shear Piezoresistance Effects," *Journal of Applied Physics*, vol. 32, No. 10, pp. 2008–2016 Oct. 1961.

Wagner, B., et al., "Electromagnetic Microactuators with Multiple Degrees of Freedom," *1991 International Conference on Solid–State Sensors and Actuators*, Digest of Technical Papers. (IEEE Cat. No. 91CH2817–5) pp. 614–617.

Petersen, K., "Silicon Torsional Mirror," *Proceedings of the IEEE* vol. 70, No. 5, pp. 61–62, May 1982.

E. Clayton Teague, et al., Para–flex Stage for Microtopographic Mapping, Review of Scientific Instruments, vol. 59, No. 1, Jan. 1988, pp. 67–73.

(List continued on next page.)

*Primary Examiner*—Thomas P. Noland
*Attorney, Agent, or Firm*—Donald E. Schreiber

[57] ABSTRACT

A topographic head for profilometry and AFM supports a central paddle by coaxial torsion bars projecting inward from an outer frame. A tip projects from the paddle distal from the bars. The torsion bars include an integrated paddle rotation sensor. A XY stage may carry the topographic head for X and Y axis translation. The XYZ stage's fixed outer base is coupled to an X-axis stage via a plurality of flexures. The X-axis stage is coupled to a Y-axis stage also via a plurality of flexures. One of each set of flexures includes a shear stress sensor. A Z-axis stage may also be included to provide an integrated XYZ scanning stage. The topographic head's frame, bars and paddle, and the XYZ stage's stage-base, X-axis, Y-axis and Z-axis stages, and flexures are respectively monolithically fabricated by micromachining from a semiconductor wafer.

20 Claims, 10 Drawing Sheets

U.S. PATENT DOCUMENTS

| | | | |
|---|---|---|---|
| 4,699,006 | 10/1987 | Boxenhorn | 73/517 |
| 4,732,440 | 3/1988 | Gadhok | 350/6.6 |
| 4,869,107 | 9/1989 | Murakami | 73/517 |
| 4,942,766 | 7/1990 | Greenwood et al. | 73/704 |
| 5,016,072 | 5/1991 | Greiff | 357/26 |
| 5,051,379 | 9/1991 | Bayer et al. | 437/225 |
| 5,111,693 | 5/1992 | Grieff | 73/514 |
| 5,116,462 | 5/1992 | Bartha et al. | 156/643 |
| 5,171,992 | 12/1992 | Clabes et al. | 250/306 |
| 5,186,041 | 2/1993 | Nyssonen | 73/105 |
| 5,201,992 | 4/1993 | Marcus et al. | 216/11 |
| 5,202,785 | 4/1993 | Nelson | 359/214 |
| 5,203,208 | 4/1993 | Bernstein | 73/505 |
| 5,220,835 | 6/1993 | Stephan | 73/517 R |
| 5,251,485 | 10/1993 | Kondo | 73/517 R |
| 5,267,471 | 12/1993 | Abraham et al. | 73/105 |
| 5,282,924 | 2/1994 | Bayer et al. | 156/643 |
| 5,285,142 | 2/1994 | Galburt et al. | 318/640 |
| 5,298,975 | 3/1994 | Khoury et al. | 356/375 |
| 5,331,852 | 7/1994 | Greiff et al. | 73/505 |
| 5,412,980 | 5/1995 | Elings et al. | 73/105 |
| 5,488,862 | 2/1996 | Neukermans et al. | 73/504.02 |
| 5,500,535 | 3/1996 | Jing | 73/105 X |
| 5,579,148 | 11/1996 | Nishikawa et al. | 359/214 |
| 5,629,790 | 5/1997 | Neukermans et al. | 359/198 |
| 5,641,897 | 6/1997 | Schuman | 73/105 |

OTHER PUBLICATIONS

J. E. Houston, et al., The Interfacial–force Microscope, Nature, vol. 356, 19, Mar. , 1992, pp. 266–267.

D. A. Grigg, et al., Rocking–Beam Force–Balance Approach to Atomic Force Microscopy, Ultramicroscopy 42–44, 1992, pp. 1504–1508.

M. G. L. Gustafsson, et al., Scanning Force Microscope Springs Optimized for Optical–Beam Deflection and With Tips Made by Controlled Fracture, Journal of Applied Physics, vol. 76, No. 1, 1, Jul. , 1994, pp. 172–181.

S. T. Smith, et al., Design and Assesment of Monolithic High Precision Translation Mechanism, Journal of Physics E: Scientific Instruments, vol. 20, 1987, pp. 977–983.

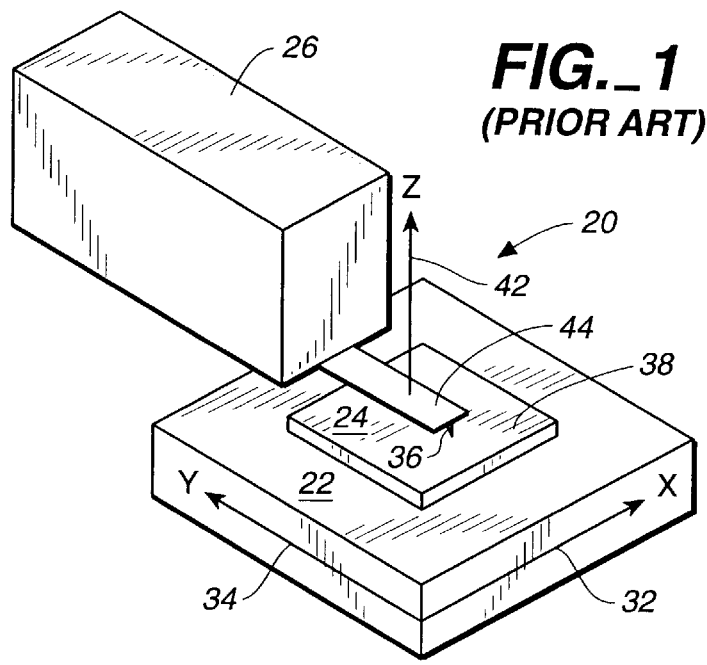
FIG._1
(PRIOR ART)
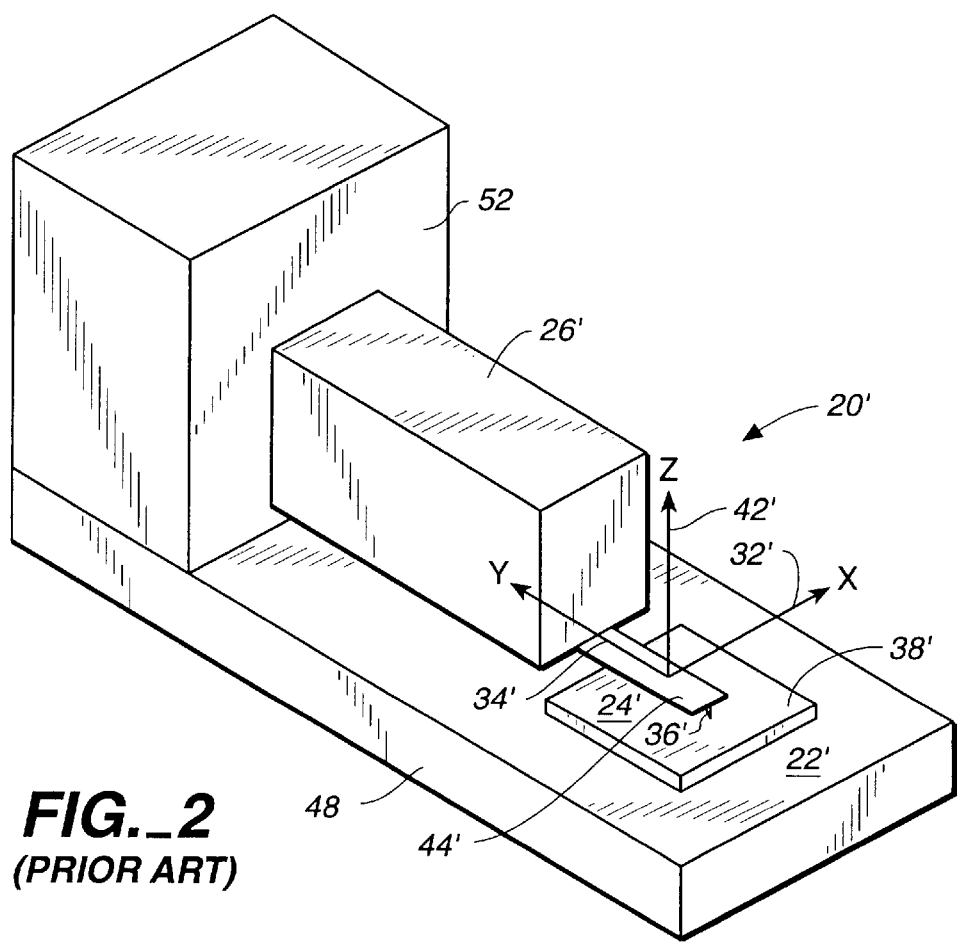
FIG._2
(PRIOR ART)

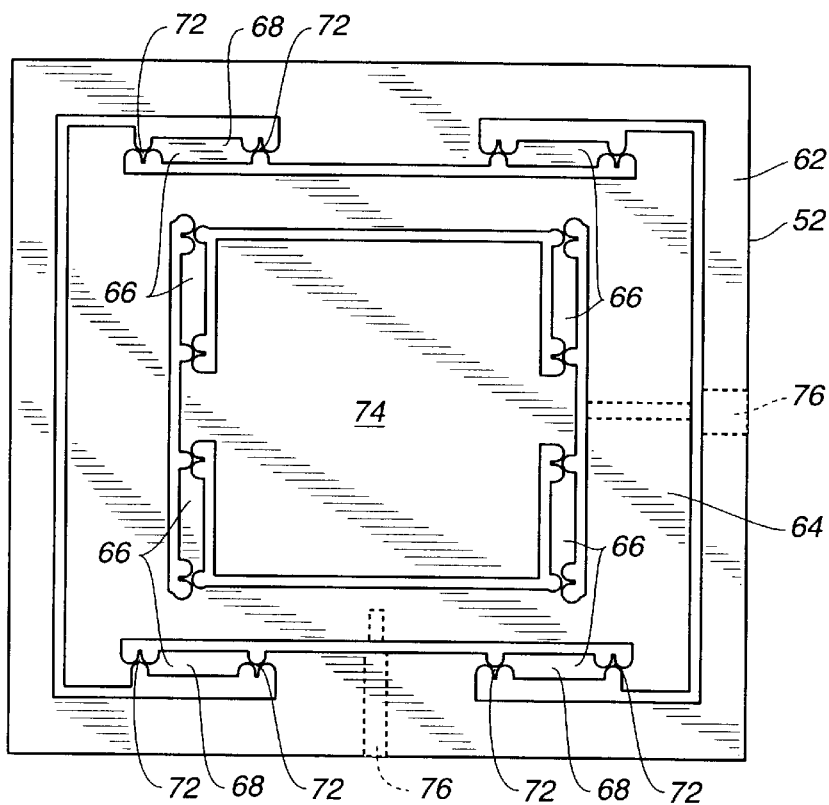
FIG._3a
*(PRIOR ART)*
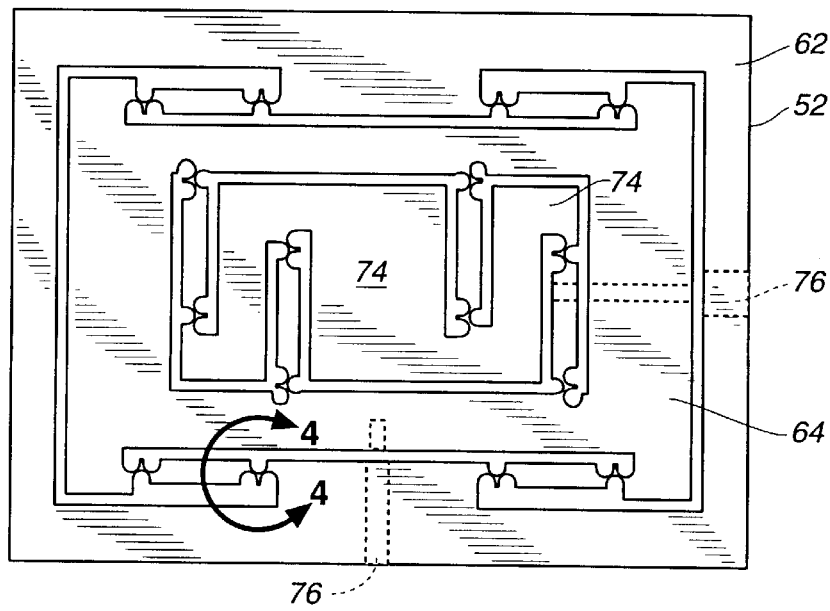
FIG._3b
*(PRIOR ART)*

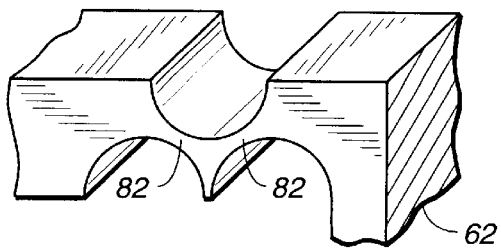
FIG._4
*(PRIOR ART)*
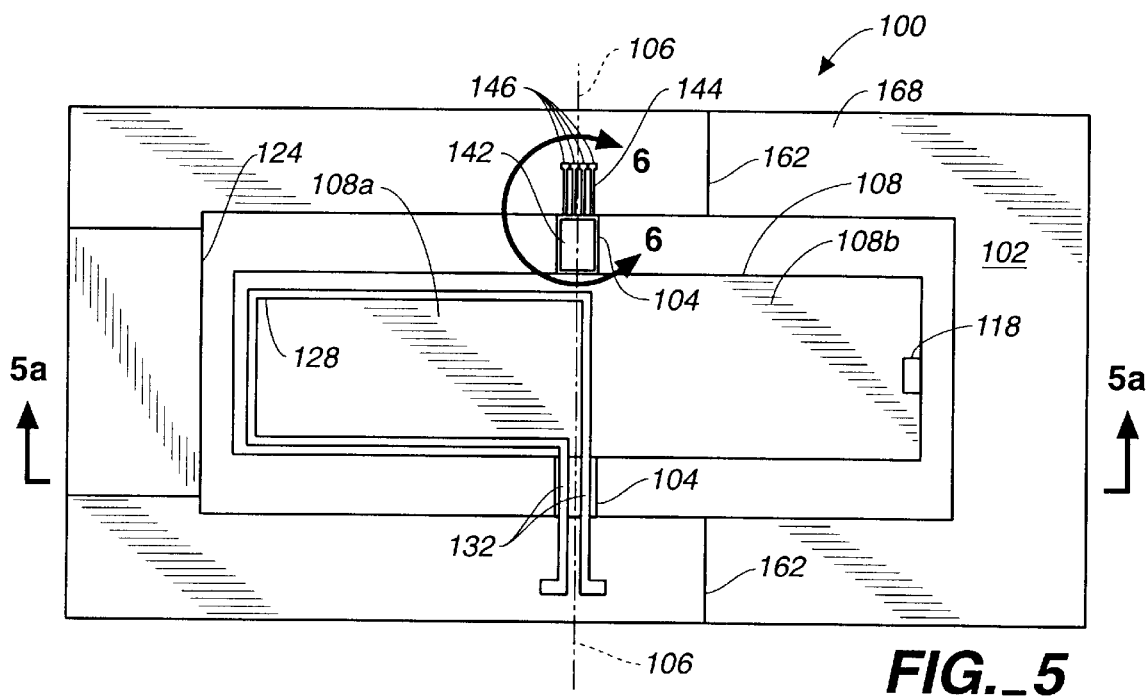
FIG._5
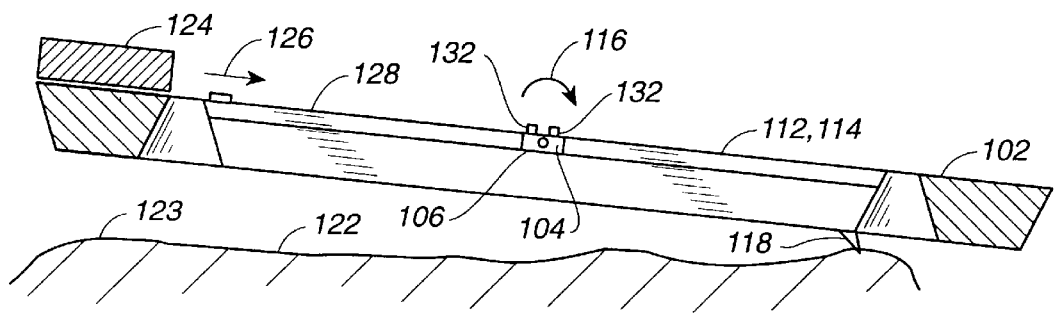
FIG._5a

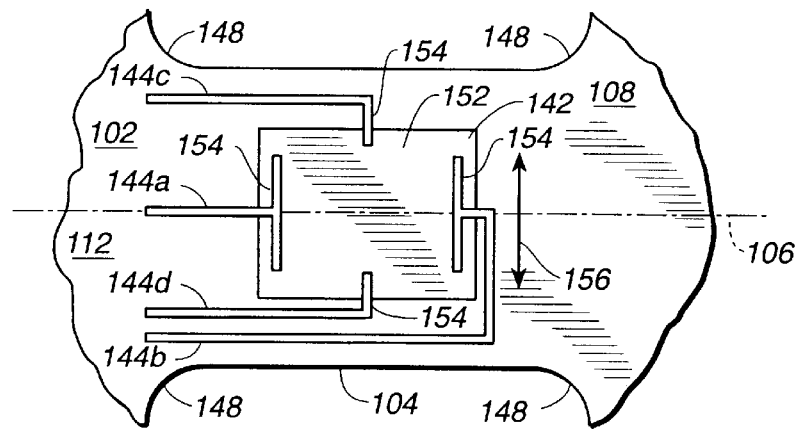
FIG._6a
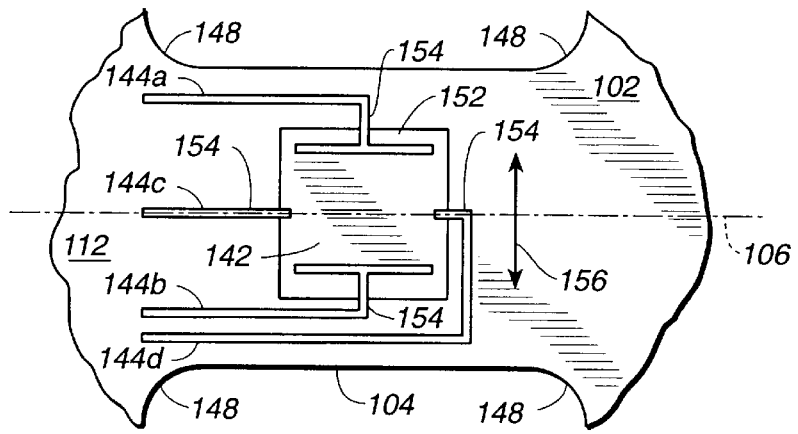
FIG._6b
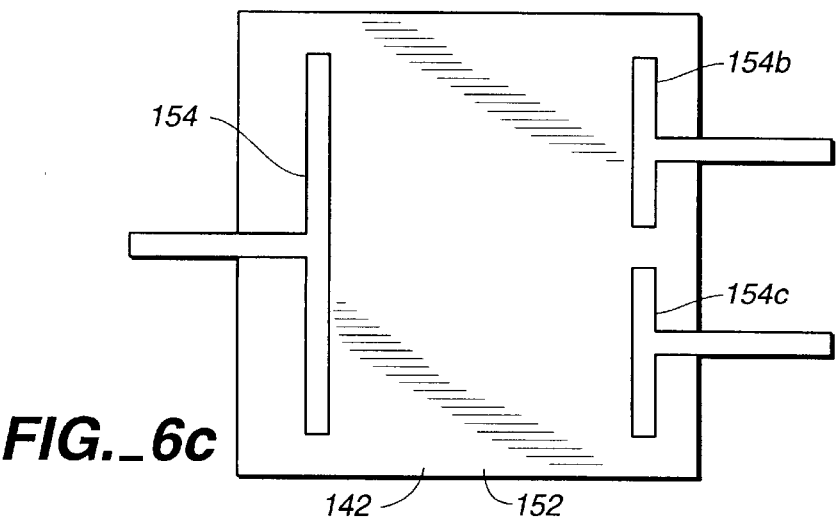
FIG._6c

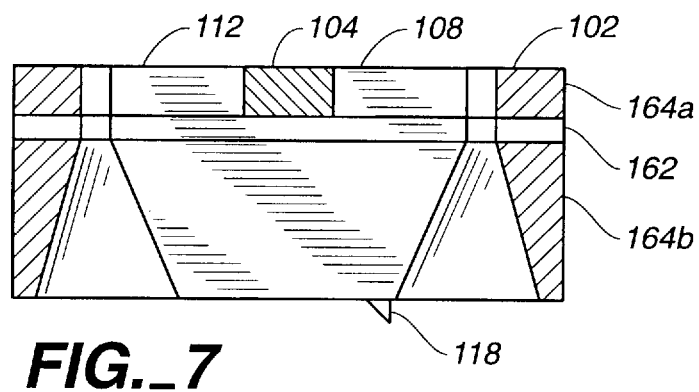
FIG._7
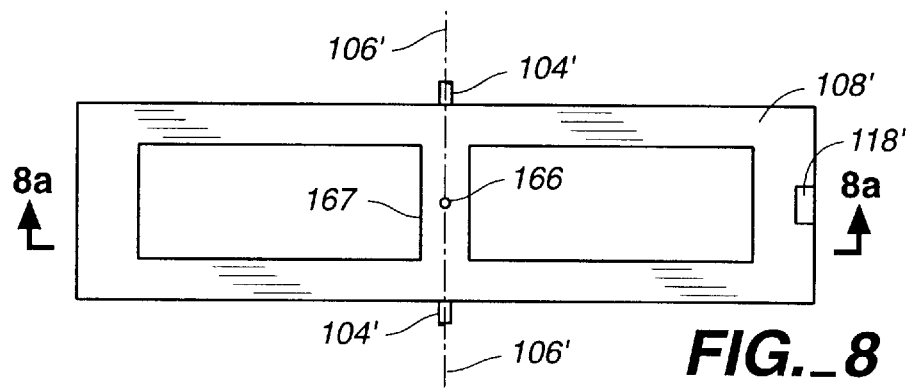
FIG._8
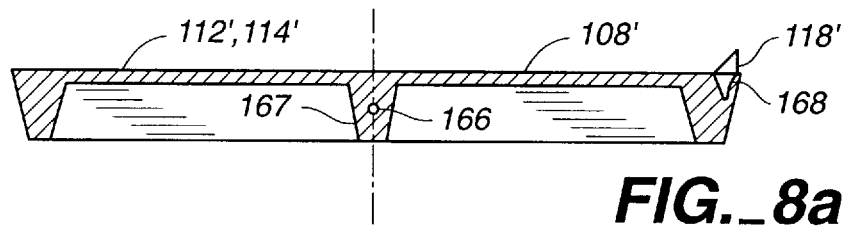
FIG._8a

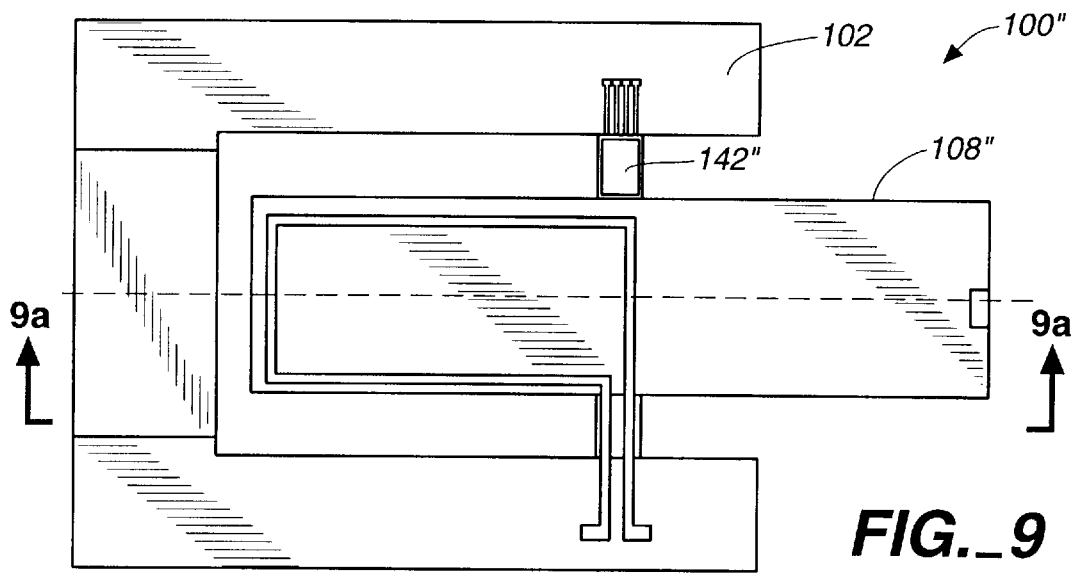
FIG._9
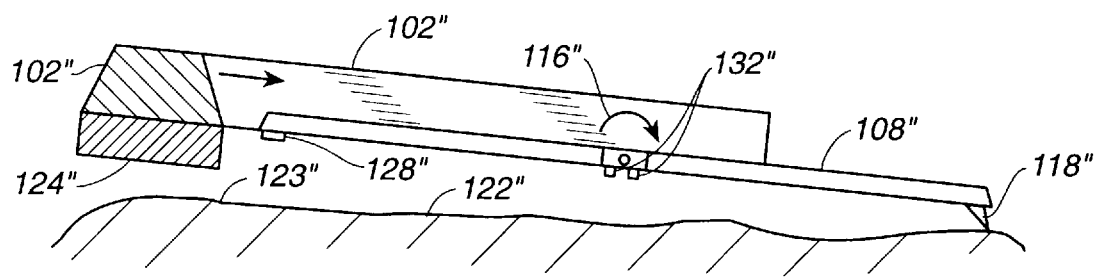
FIG._9a
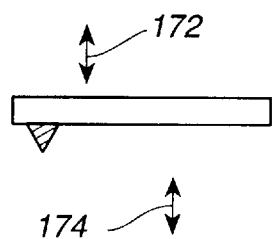
FIG._10
(PRIOR ART)
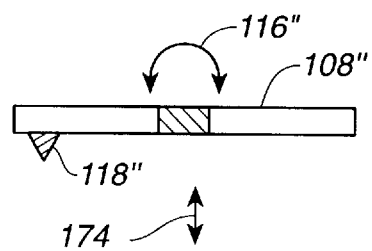
FIG._11

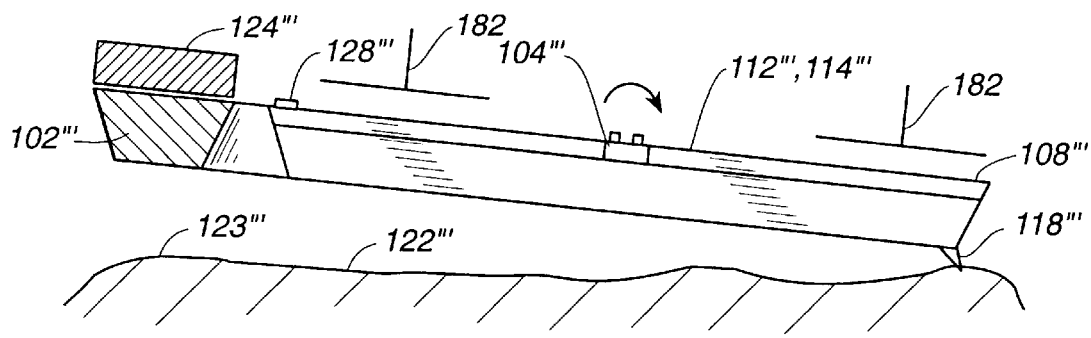
FIG._12
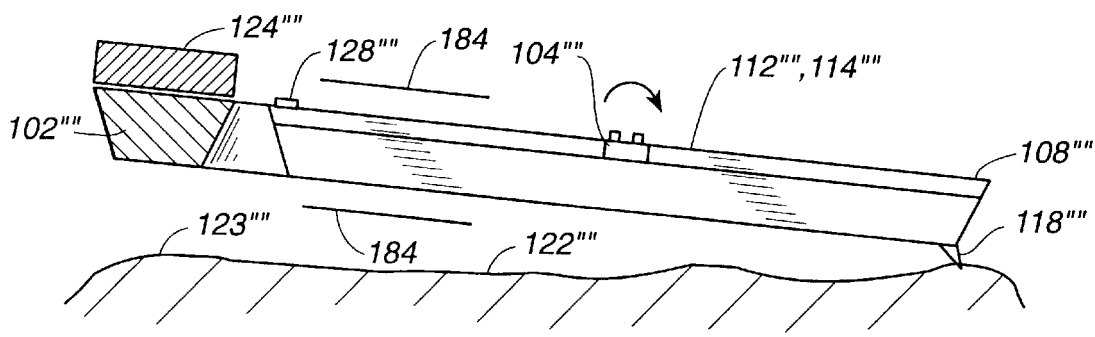
FIG._13
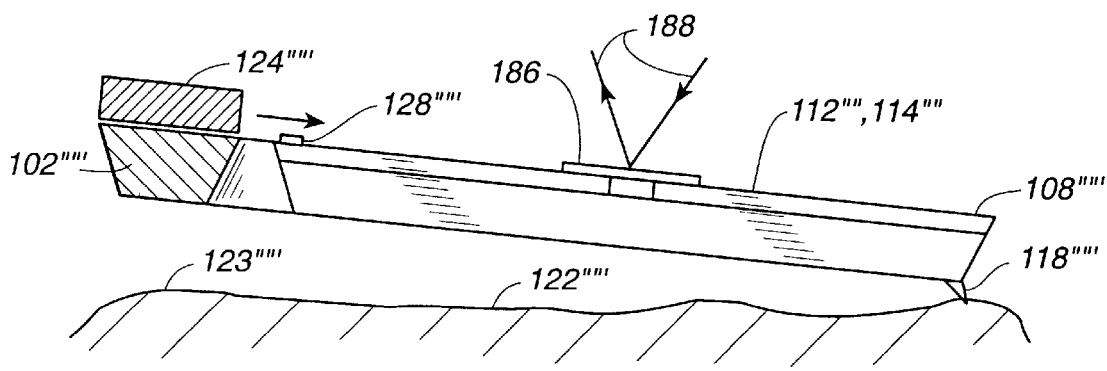
FIG._14

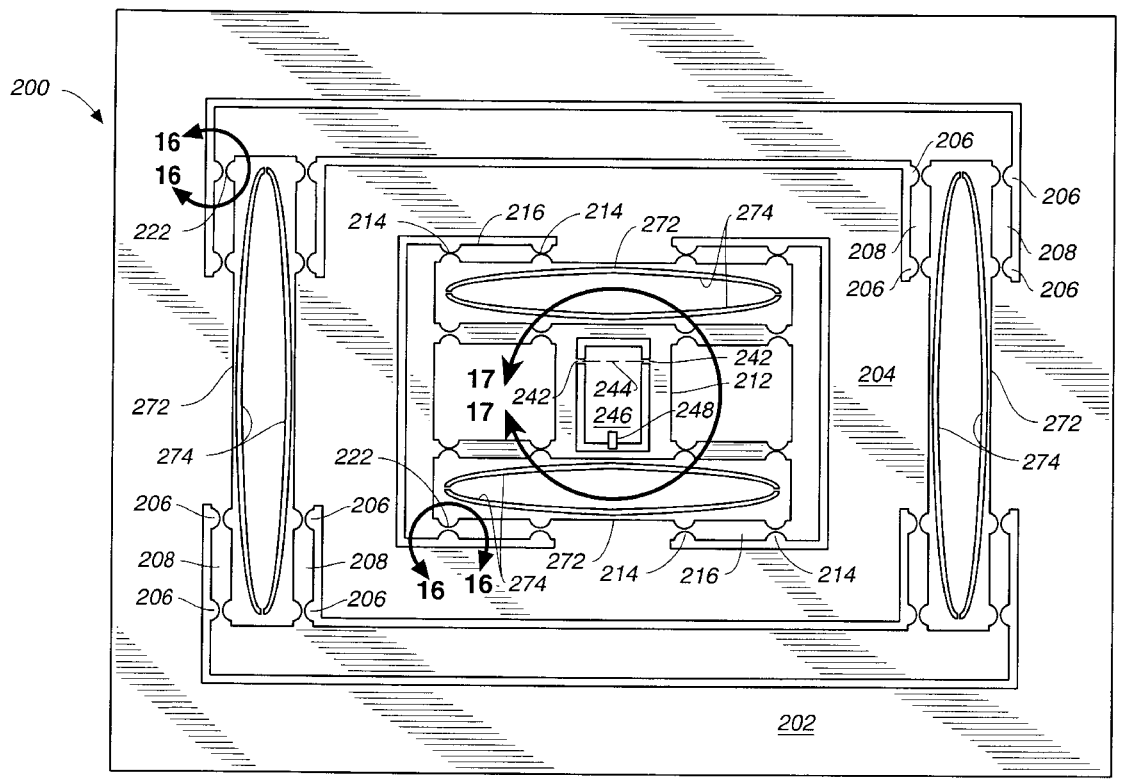
FIG._15

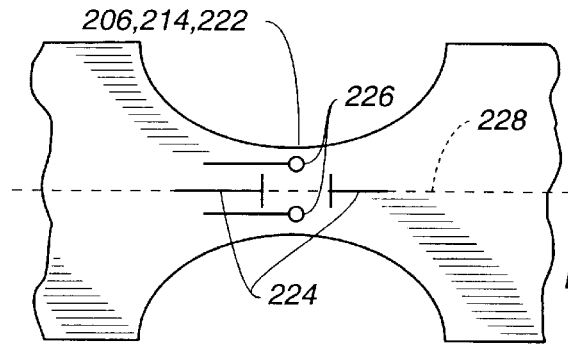
FIG._16a
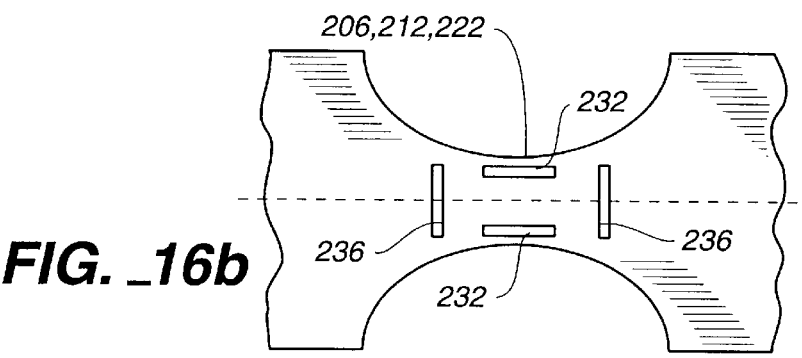
FIG._16b
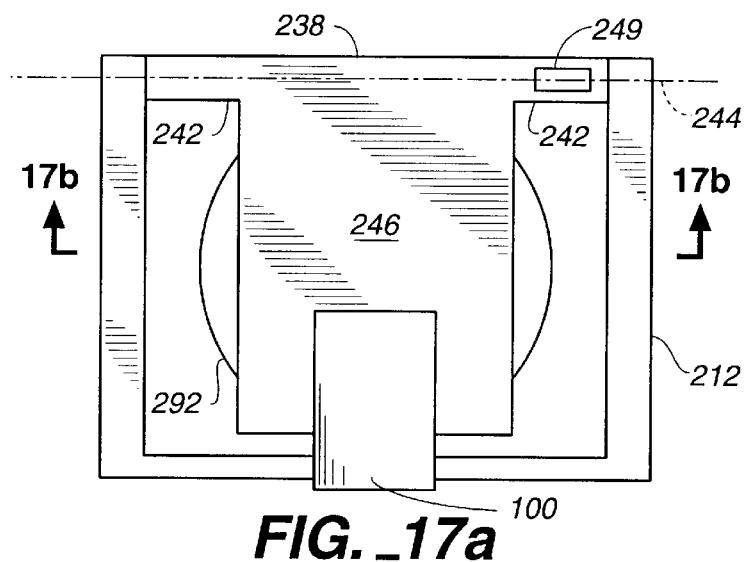
FIG._17a
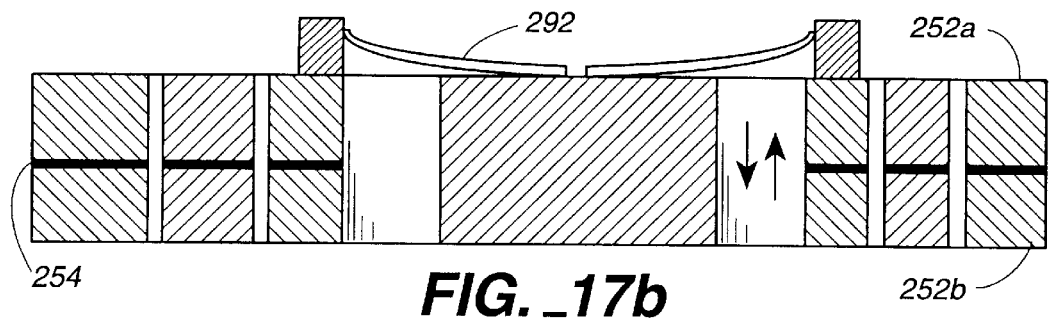
FIG._17b

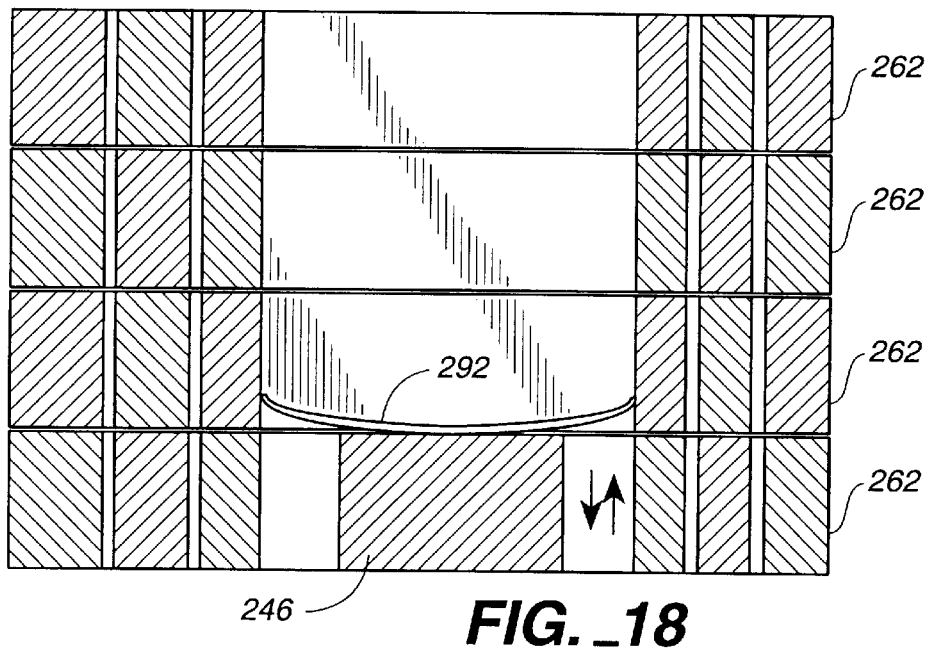
FIG._18
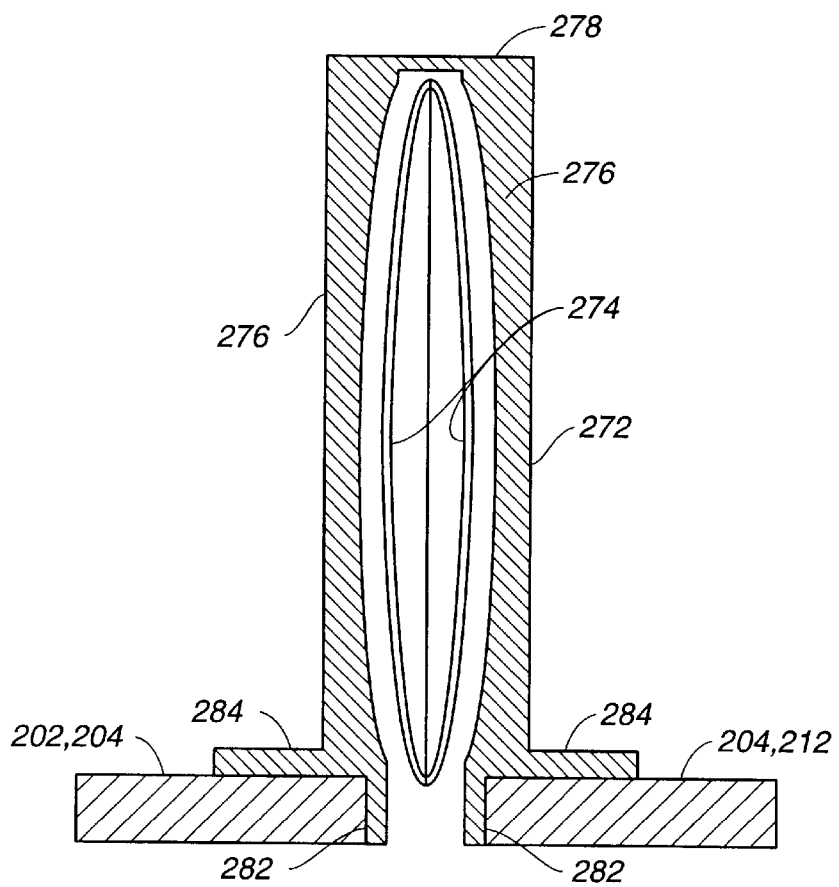
FIG._19

INTEGRATED SILICON PROFILOMETER AND AFM HEAD

CLAIM OF PROVISIONAL APPLICATION RIGHTS

This application claims the benefit of U.S. Provisional patent application No. 60/008,495 filed on Dec. 11, 1995.

BACKGROUND OF THE INVENTION

1. Field of the Invention

The present invention relates generally to that area of metrologic technology concerned with measuring a surface's topology, and, more particularly, to profilometry, and to atomic force microscopy ("AFM), also sometimes referred to as scanning force microscopy ("SFM").

2. Description of the Prior Art

Recently, the field of surface profilometry has expanded greatly. In addition to advances in classical profilometry, the nascent fields of tunneling force microscopy and AFM have greatly enlarged the interest, scope and capability of profilometric technology.

Classical profilometry scans a surface along orthogonal X-axis and Y-axis directions using a diamond tipped stylus while measuring the stylus' vertical (Z-axis) displacement. In many commercial instruments, the stylus is connected to a linear variable differential transformer ("LVDT") sensor, or to a capacitive plate, for sensing the stylus' vertical displacement. Typically, the stylus includes an elongated bar that is secured with a pair of coaxial pivots, while the other end of the stylus is coupled to the Z-axis displacement sensing mechanism, e.g. either a capacitor's plate for a capacitive sensor, or a ferromagnetic plunger of the LVDT sensor.

Very sensitive flexure pivot assemblies are commonly used for supporting the stylus used for classical profilometry. The components of such a flexure pivot assembly are small, delicate, require precision assembly, and therefore are expensive to manufacture. In addition, machining such stylus assemblies from discrete components tends to make them comparatively large, and the sensing elements to which they couple are also relatively large. Therefore, profilometer heads including the stylus are, in general, larger than desirable. Consequently, profilometer heads generally respond slowly to vertical displacements, and the scanning speed at which profilometers operate is limited by the inertia of the profilometer's head. Hence, improving profilometer performance while concurrently reducing their manufacturing cost and contact force makes gentler, smaller, lighter, faster and less expensive profiling heads very desirable.

The more recently developing field of AFM for measuring a surface's topography generally uses a very light, micromachined, bendable cantilever probe having a sharp tip for sensing a surface's topology at atomic dimensions. However, systems for detecting minute vertical displacement of an AFM's sensing probe, e.g. optical-beam-deflection or optical interferometry, are, in general, much larger than the cantilever itself. Consequently, it is generally difficult to move an AFM's head assembly as swiftly as desired for high speed scanning. Traditionally, AFM systems circumvented this problem by holding the sensing head assembly stationary while moving the sample along orthogonal X and Y axes. Although such a system may move small samples easily during AFM scanning, it is generally unsuited for use on large samples, such as semiconductor wafers or magnetic recording disks measuring several inches in diameter.

Accordingly, not only does AFM necessarily require a physically small AFM sensing probe, but advancing AFM technology and performance also makes a correspondingly small, light weight, and compact sensor for detecting AFM probe Z-axis displacement desirable. Integration of a compact vertical displacement sensor into an AFM probe would yield a small, light weight, and compact AFM head having a low mass. Such a low mass AFM probe would permit very high speed scanning along orthogonal X-axis and Y-axis directions by a small and compact X-axis and Y-axis drives.

Referring now to FIG. 1, depicted there is a prior art AFM or profilometer system referred to by the general reference character 20. The system 20 includes a XY axes drive 22 upon which rests a sample 24. The XY axes drive 22 scans the sample 24 laterally with respect to a sensing head 26 along a X-axis 32 and a Y-axis 34 that are orthogonal to each other, or along any other arbitrary axes obtained by compound motion along the X-axis 32 and the Y-axis 34. In the instance of an AFM, to provide rapid movement along the axes 32 and 34 the XY axes drive 22 may be provided by a piezo electric tube having 4 quadrant electrodes. As the XY axes drive 22 moves the sample 24 laterally, a probe tip or stylus 36 lightly contacts an upper surface 38 of the sample 24 while moving up and down vertically parallel to a Z-axis 42 in response to the topology of the upper surface 38. In the illustration of FIG. 1, the probe tip or stylus 36 is secured to a distal end of an elongated cantilever arm 44 extending outward from the sensing head 26. The sensing head 26, which may if necessary be servoed up and down parallel to the Z-axis 42, senses vertical deflection of the probe tip or stylus 36 by the topology of the sample's upper surface 38. A signal transmitted from the sensing head 26 to some type of signal processing device permits recording and/or displaying the topology of the upper surface 38 as detected by the system 20.

AFM applications of systems such as of the system 20 experience substantial cross coupling among movements along the mutually perpendicular axes 32, 34, and 42. Consequently, movement of the sample 24 with respect to the AFM sensing head 26, and frequently even the measurement of such movement, are insufficiently precise for metrologic applications. Consequently, at present AFM performance may be adequate for imaging, but not for metrology. The mass of the sample 24 itself (such as an 8 inch diameter semiconductor wafer) impedes high speed, precise movement of the sample 24. Therefore, scanning a massive sample 24 swiftly requires holding the sample 24 fixed while scanning the sensing head 26.

FIG. 2 depicts an alternative embodiment, prior art AFM or profilometer system. Those elements depicted in FIG. 2 that are common to the AFM or profilometer system depicted in FIG. 1 carry the same reference numeral distinguished by a prime (') designation. In the system 20' depicted in FIG. 2, the sample 24' rests on a base plate 48 which also supports a XY stage 52. In scanning the sample 24' using the system 20', the XY stage 52 moves the sensing head 26' carrying the cantilever arm 44' parallel to the orthogonal X-axis 32' and Y-axis 34', or along any other arbitrary axes obtained by compound motion along the X-axis 32' and the Y-axis 34'.

E. Clayton Teague, et al., in a technical article entitled "Para-flex Stage for Microtopographic Mapping" published the January 1988, issue of the Review of Scientific Instruments, vol. 59 at pp. 67–73 ("the Teague et al. article"), reports development of a monolithic, Para-flex XY stage 52, that the article describes as being machined out of metal. The embodiments of the monolithic plate of such an XY stage 52 is depicted both in FIG. 3a and 3b. The XY stage 52 depicted in both FIGS. includes an outer base 62 that is fixed with respect to the system 20'. The outer base 62 is coupled to and supports a Y-axis stage 64 by means of four stage suspensions 66. Each of the stage suspensions 66 consists of an intermediate bar 68, one end of which is coupled to the outer base 62 by a flexure 72, and another, distal end of the intermediate bar 68 is coupled to the Y-axis stage 64 by a second symmetrical flexure 72. Similar to the coupling of the outer base 62 to the Y-axis stage 64, the Y-axis stage 64 is coupled to and supports a X-axis stage 74 by means of four stage suspensions 66 that are identical to the stage suspensions 66 which couple the outer base 62 to the Y-axis stage 64. The stage suspensions 66 coupling the outer base 62 to the Y-axis stage 64 and the stage suspensions 66 coupling the Y-axis stage 64 to the X-axis stage 74 are oriented perpendicular to each other. Consequently, the inner X-axis stage 74 moves substantially perpendicularly to movement of the Y-axis stage 64, with both stages 64 and 74 moving with great accuracy with respect to the outer base 62. Movement of the stages 64 and 74 with respect to the outer base 62 is effected by a pair of mutually orthogonal stepping-motor-controlled micrometer screw drives, not illustrated in any of the FIGS., which respectively have a pushrod connection to the Y-axis stage 64 and the X-axis stage 74. The screw drives extend from outside the outer base 62 through drive apertures 76 to respectively contact the Y-axis stage 64 and the X-axis stage 74. The XY stage 52 depicted in FIG. 3b differs from that depicted in FIG. 3a in that the stage suspensions 66 coupling the Y-axis stage 64 to the X-axis stage 74 are folded which reduces the space occupied by the XY stage 52. The XY stage 52 reported by C. Teague, et al. provides accurate movement along mutually perpendicular axes 32' and 34'. However, the XY stage 52 depicted in FIGS. 3a and 3b provides no motion amplification.

FIG. 4 depicts the flexure 72 indicated on the XY stage 52 depicted in FIG. 3b. The flexure 72 employs a pair of webs 82 arranged in a W-shaped configuration to span between the outer base 62 and the intermediate bar 68, between the intermediate bar 68 and the Y-axis stage 64, between the Y-axis stage 64 and the intermediate bar 68, and between the intermediate bar 68 and the X-axis stage 74. The flexure 72 depicted in FIG. 4 permits both longitudinal stretching and rotation.

If the XY stage 52 is made by conventional techniques, even a monolithic XY stage 52 such as that disclosed in the Teague et al. article, the resonance frequency is typically a few hundred Hz. Stepping-motor-controlled micrometer screw drives or other forms of push rods for displacing the XY stage 52 are typically limited to relatively low frequency operation. Consequently, the XY stage 52 of an AFM can only be servoed at relatively low speed.

Recent advances in reactive ion etching processes and apparatus for etching silicon permit forming deep vertical structures. For example the new Alcatel etcher produces etching aspect ratios of 300/1, and therefore permits etching through wafers several hundred microns thick. Other etchers having similar performance are now available. Some techniques for wet etching, (such as [100] orientation etching), may also be used to fabricate structures having correspondingly high aspect ratios. These improved processes permit construction of structures of metrologic precision with macro dimensions. This method therefore makes it possible to construct structures of aspect ratios that normally can only be achieved by EDM (electric discharge machining) of metals. These advances in micromachined silicon fabrication technology permits executing classical designs for the XY stage 52 to provide metrologic quality.

SUMMARY OF THE INVENTION

An object of the present invention is to provide a topographic head in which a Z-axis sensor is integrated into the topographic head.

Another object of the present invention is to provide a topographic head for profilometry having a shape that is defined by photolithography, and that is made from silicon.

Another object of the present invention is to provide a topographic head for profilometry with less contact force.

Another object of the present invention is to provide a smaller topographic head for profilometry.

Another object of the present invention is to provide a lighter topographic head for profilometry.

Another object of the present invention is to provide a topographic head adapted for use in AFM having both a Z-axis sensor and tip integrated into the topographic head.

Another object of the present invention is to provide a topographic head for use in AFM having very good sensitivity, low contact force, low cost and fast response.

Another object of the present invention is to provide a topographic head for use in AFM that is adapted for "rocking mode operation."

Another object of the present invention is to provide a topographic head having simpler topographic head motions.

Another object of the present invention is to provide a topographic head adapted for "rocking mode operation" which decouples the sensing head's driving mode from the sensing head's sensing mode.

Another object of the present invention is to provide an inherently low-cost topographic head.

Another object of the present invention is to provide a higher performance topographic head.

Another object of the present invention is to provide a topographic head that provides a flexible design.

Another object of the present invention is to provide an easily fabricated topographic head.

Another object of the present invention is to provide an AFM XYZ stage having a very fast response.

Another object of the present invention is to provide a metrologic quality XY stage.

Another object of the present invention is to provide an AFM XYZ stage that is simpler to fabricate.

Briefly, the present invention is a micromachined, topographic head, adapted for use in sensing topography of a surface, that has an outer frame from which torsion bars project inwardly to support a central paddle. The torsion bars are aligned along a common axis thereby permitting the central paddle to rotate about the common axis. The frame, torsion bars and central paddle are all monolithically fabricated from a semiconductor single-crystal silicon wafer. The central paddle defines a rest plane if no external force is applied to the central paddle, and is rotatable about the common axis by a force applied to the central paddle. The central paddle also includes a tip that projects outward from the central paddle distal from the torsion bars, the tip being adapted for sensing the topography of a surface. The topographic head also includes drive means for imparting rotary motion to the central paddle about the common axis, and a rotational-position sensing means for measuring the rotational position of the central paddle about the common axis of the torsion bars.

The present invention also includes a micromachined XYZ stage for supporting, and carrying for X-axis, Y-axis and Z-axis translation, various different types of scanning microscopy sensors such as the topographic sensor described above, or an optical near-field, tunneling, or field-emission microscope sensor. The XYZ stage includes an outer stage-base that is adapted to be held fixed with respect to a surface to be scanned. The outer stage-base is coupled to and supports an intermediate X-axis stage via a plurality of flexures disposed between the outer stage-base and the intermediate X-axis stage. At least one of the flexures coupling between the stage-base and the X-axis stage has a shear stress sensor formed therein for sensing stress in that flexure. The intermediate X-axis stage is coupled to and supports an inner Y-axis stage via a plurality of flexures. At least one of the flexures coupling between the X-axis stage and the Y-axis stage has a shear stress sensor formed therein for sensing stress in that flexure. The stage-base, X-axis stage, Y-axis stage, and flexures are all monolithically fabricated from a semiconductor wafer. A Z-axis stage may also be included to provide an integrated XYZ stage.

The preferred Z-axis stage is in many ways similar to the topographic head described above. The preferred Z-axis stage has torsion bars that project inwardly from opposing sides of the Y-axis stage. The torsion bars are aligned along a common axis for supporting a Z-axis paddle within the Y-axis stage. The torsion bars and Z-axis paddle are preferably monolithically fabricated from a semiconductor single-crystal silicon layer of a substrate together with the stage-base, X-axis stage, Y-axis stage, and flexures. The torsion bars support the Z-axis paddle within the Y-axis stage for rotation about the torsion bars' common axis. An external force is applied to the Z-axis paddle causes the Z-axis paddle to rotate about the common axis to a rotational-position displaced from the Z-axis paddle's rest plane. The Z-axis stage includes a drive means, preferably piezo-electric disks for urging to the Z-axis paddle to rotate about the common axis of the torsion bars. A rotational-position sensing means, preferably integrated into the torsion bars, measures the rotational-position of the Z-axis paddle about the common axis of the torsion bars.

The Z-axis stage of the XYZ stage may carry an AFM sensor that adapts the XYZ stage for sensing topography of a surface. More specifically, the AFM mead may be the topographic head described above. Accordingly, the AFM sensor carried by the Z-axis stage includes torsion bars that project inwardly from opposing sides of an outer frame, and are aligned along a common axis to support a central paddle within the Y-axis stage, The torsion bars and central paddle are all monolithically fabricated from a semiconductor single-crystal silicon layer of a substrate. The central paddle is supported for rotation about the common axis of the torsion bars and defines a rest plane if no external force is applied to the central paddle. A force applied to the central paddle may rotate it around the common axis of the torsion bars to a rotational-position displaced from the rest plane. The central paddle includes a tip that projects outward from an end of the central paddle distal from the torsion bars. The tip is adapted for juxtaposition with a surface for sensing the topography thereof.

The preceding invention provides integration in silicon of the mechanical components and the electrical sensors required by a topographic head. Accordingly, the present invention substantially enhances the performance of profilometers and AFMs, and reduces their size, while at the same time reducing their cost.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1 is a diagram that depicts one embodiment of a prior art AFM or profilometer system in which an XY stage moves a sample laterally while sensing vertical (Z-axis) deflection of a probe tip or stylus;

FIG. 2 is a diagram that depicts an alternative embodiment of a prior art AFM or profilometer system in which a sample is held fixed while an XY stage moves a sensing head laterally while the head senses vertical (Z-axis) deflection of a probe tip or stylus;

FIGS. 3a and 3b are a plan views illustrated alternative embodiments of a monolithic, Paraflex XY stage adapted for use in AFM of a type reported by C. Teague, et al.;

FIG. 4 is a perspective view depicting a flexure incorporated into the monolithic, Paraflex XY stage illustrated in FIGS. 3a and 3b;

FIG. 5 is a plan view depicting the frame, torsion bar and central paddle of a topographic head in accordance with the present invention;

FIG. 5a is a cross-sectional view of the topographic head depicted in FIG. 5 taken along the line 5a—5a;

FIGS. 6a and 6b are plan views depicting alternative embodiments of a four-terminal torsion sensor located on a torsion bar taken along a line 6—6 in FIG. 5;

FIG. 6c is plan view, similar to the plan views of FIGS. 6a and 6b, that depicts yet another alternative embodiment of the torsion sensor having only three-terminals;

FIG. 7 is a cross-sectional view of a topographic head, similar to the cross-sectional view depicted in FIG. 5a, that illustrates physical characteristics of a substrate semiconductor wafer preferably used for fabricating the topographic head;

FIG. 8 is a plan view depicting an alternative embodiment of the central paddle depicted in FIG. 5;

FIG. 8a is a cross-sectional view of the central paddle depicted in FIG. 8 taken along the line 8a—8a;

FIG. 9 is a plan view depicting the frame, torsion bar and central paddle for an AFM topographic head in accordance with the present invention;

FIG. 9a is a cross-sectional view of the AFM topographic head depicted in FIG. 9 taken along the line 9a—9a;

FIG. 10 is a force diagram depicting forces applied to a prior art, cantilever oscillating AFM topographic head;

FIG. 11 is a force diagram depicting forces applied to a torsional oscillating AFM topographic head in accordance with the present invention;

FIG. 12 is a cross-sectional view of an alternative embodiment topographic head similar to that depicted in FIG. 5a adapted for capacitively sensing topographic head movement with a pair of capacitor plates disposed on the same side of the topographic head;

FIG. 13 is a cross-sectional view of an alternative embodiment topographic head similar to that depicted in FIG. 5a adapted for capacitively sensing topographic head movement with a pair of capacitor plates disposed on opposite sides of the topographic head;

FIG. 14 is a cross-sectional view of an alternative embodiment topographic head similar to that depicted in FIG. 5a adapted for optically sensing topographic head movement with a light beam reflected from a surface of the topographic head;

FIG. 15 is a plan view of a micromachined XYZ scanning stage in accordance with the present invention adapted for use in an AFM which employs flexures to permit lateral motion of the XY scanning stage with respect to a sample;

FIGS. 16a and 16b are alternative plan views of a flexure included in the XY scanning stage in accordance with the present invention taken along the line 16—16 of FIG. 15;

FIG. 17a is an enlarged plan view of a Z-axis stage included in the XYZ scanning stage taken within the line 17—17 of FIG. 15;

FIG. 17b is a cross-sectional view of the Z-axis stage taken along the line 17b—17b in FIG. 17a depicting fabrication of the XYZ scanning stage from bonded silicon wafers;

FIG. 18 is a cross-sectional view of a XY scanning stage, similar to the view of FIG. 17b depicting assembling and bonding together of the XY scanning stage from a stack of silicon wafers each of which has been pre-processed to form individual XY scanning stages; and FIG. 19 is a cross-sectional plan view depicting piezo plates arranged in a face-to-face configuration and secured within a clamshell arrangement.

DETAILED DESCRIPTION OF THE PREFERRED EMBODIMENT

FIG. 5 depicts a micromachined topographic head in accordance with the present invention that is identified by the general reference character 100, and that is adapted for use in sensing topography of a surface. The topographic head 100 includes a planar frame 102 from which inwardly project a pair of opposing torsion bars 104. The torsion bars 104 are aligned along a common axis 106 and support a central paddle 108 within the frame 102. While FIG. 5a depicts the torsion bar 104 as having a rectangular cross-section, the torsion bars 104 need not necessarily have the aspect ratio depicted there. The cross-section of the torsion bars 104 may, in fact be square, rounded or trapezoidal. The frame 102, torsion bars 104 and central paddle 108 are all monolithically fabricated from a semiconductor single-crystal silicon layer of a substrate wafer. The central paddle 108 is rotatable about the common axis 106 of the torsion bars 104. When using a common [100] oriented silicon wafer, the torsion bars 104 are preferably oriented along the [100] crystallographic direction, or the [110] crystallographic direction. The torsion bars 104 may be hardened by conversion of a surface layer therof into silicon carbide or silicon nitride. The physical properties of the torsion bars 104 in relationship to the central paddle 108, particularly with respect to vibrational modes, are those described in U.S. patent application Ser. No. 08/139,397 filed by the inventors of the present application on Oct. 18, 1993, and now U.S. Pat. No. 5,629,790 entitled "Micromachined Torsional Scanner," which patent application is hereby incorporated by reference.

With no external force applied to the central paddle 108, a planar surface 112 of the central paddle 108 defines a rest plane 114 illustrated in FIG. 5a. If an external force is applied to the central paddle 108, the central paddle 108 will be displaced from the rest plane 114 as indicated by a curved arrow 116. The central paddle 108 also includes a tip 118 that projects outward from the central paddle 108 distal from the torsion bars 104. As illustrated in FIG. 5a, the tip 118 is adapted to be juxtaposed with a surface 122 of a sample 123 for sensing the topography thereof.

The topographic head 100 also preferably includes a small permanent magnet 124 (or electromagnet) located on the frame 102 which provides a magnetic field 126, indicated by an arrow in FIG. 5a, that is oriented parallel to the rest plane 114. A planar coil 128, having a pair of coil leads 132 that are brought out onto the frame 102 via one of the torsion bars 104, is deposited on the planar surface 112 of the central paddle 108. The planar coil 128 may consist of a single turn coil as illustrated in FIG. 5, or it may consist of a multiple turn coil. In the latter case, an overlap of one turn or a wire bond connection must be provided in one of the coil leads 132. An electric current flowing through the planar coil 128 generates a magnetic field which interacts with the magnetic field 126 from the permanent magnet 124 to apply a torque to the central paddle 108 that urges the central paddle 108 to rotate about the common axis 106. Rotation of the central paddle 108 with respect to the frame 102 responsive to an electric current through the planar coil 128 permits controlling the force which the tip 118 applies to the surface 122.

The torsion bar 104 that does not carry the coil leads 132 preferably has a torsion sensor 142 formed thereon. The torsion sensor 142 is of the type described both in U.S. patent application Ser. No. 08/139,397 identified above, and in U.S. Pat. No. 5,488,862 entitled "Monolithic Silicon Rate-Gyro With Integrated Sensors" which issued on Feb. 6, 1996, which was filed by the inventors of the present application, and which patent application and issued patent are incorporated herein by reference. As described in the patent application and patent identified above, the torsion sensor 142 preferably has four metallic sensor leads 144 which terminate on the frame 102 in individual torsion sensor pads 146. The torsion sensor pads 146 permit bonding or soldering to external leads, not illustrated in any of the FIGS. An electrical signal produced by the torsion sensor 142 permits sensing the rotational-position of the central paddle 108 about the common axis 106 of the torsion bars 104 with respect to the frame 102.

As described in the patent application and issued patent identified above and as illustrated in greater detail in FIGS. 6a and 6b, the torsion sensor 142 is preferably a four-terminal piezo sensor. FIG. 6a depicts an embodiment of the torsion sensor 142 in which an electric current flows parallel to the common axis 106. FIG. 6b depicts an alternative embodiment of the torsion sensor 142 in which an electric current flows perpendicular to the common axis 106. When using p-type [100] silicon material as a substrate for fabricating the torsion bars 104, the crystallographic direction of the torsion bar 104 should be along the [100] axis. When using n-type [100] silicon material as a substrate for fabricating the torsion bars 104, the crystallographic direction should be along the [110] axis. As set forth above, either of these crystallographic directions are compatible with fabrication of the torsion bars 104. FIGS. 6a and 6b also illustrate rounded corners 148 joining the torsion bars 104 to the frame 102 and to the central paddle 108.

To constrain electric current flowing through the torsion sensor 142 to the planar surface 112 of the torsion bar 104, a sensor region 152 of the torsion bar 104 is implanted or diffused with a dopant material. For example if torsion bar 104 is fabricated either using p-type or n-type substrate material oriented along [100] crystallographic direction, then a p+ dopant is implanted or diffused into the sensor region 152 of the planar surface 112. While implantation of a p+ dopant material into an n-type substrate produces a junction isolation, in either case the electric current will be constrained to the planar surface 112. Likewise if n-type or p-type substrate material is used with the torsion bar 104 oriented in the [110] crystallographic direction, an n+ dopant is implanted or diffused to produce an n-type sensor region 152 for the torsion sensor 142, either without or with junction isolation. If the torsion bars 104 are thick with respect to separation between opposing pairs of torsion sensor electrodes 154, in principle implantation or diffusion may be omitted.

The metallic sensor leads 144 all form ohmic contacts to the implanted or diffused sensor region 152, but are otherwise electrically isolated from the planar surface 112 of the torsion bar 104. During operation of the topographic head 100, an electric current is applied to torsion sensor leads 144a and 144b. Torsion stress in the torsion bar 104, illustrated in FIGS. 6a and 6b by a double-headed arrow 156, that results from rotation of the central paddle 108 with respect to the frame 102, generates a voltage between torsion sensor leads 144c and 144d. The voltage generated between the torsion sensor leads 144c and 144d is proportional to the current applied through torsion sensor leads 144a and 144b, and to the torsion (shear) stress 156 in the torsion bar 104. One advantage of the torsion sensor 142 is that it is insensitive to linear stresses in the torsion bar 104, such as those caused by the weight of the central paddle 108. However, the torsion bars 104 must be of very high, metrologic quality, and must be stress free. Accordingly, the topographic head 100 is preferably fabricated using SOI for the substrate material as described in the patent application and issued patent identified above. Alternatively, the topographic head 100 may be fabricated from conventional silicon wafers using a timed etch for controlling the thickness of the torsion bars 104.

FIG. 6c is an alternative embodiment of the torsion sensor 142 which splits one of the current torsion sensor electrodes 154 symmetrically in two parts 154a and 154b. Twisting the torsion bar 104 induces a differential change in the electric current flowing through the two halves of the torsion sensor electrodes 154b and 154c. In the torsion sensor 142 depicted in FIG. 6c, separate voltage sensing torsion sensor electrodes 154 are not required. All orientations of the torsion sensor 142 with respect to the crystallographic directions are otherwise identical to the four-terminal torsion sensor 142.

As illustrated in FIG. 7, the preferred substrate for fabricating the topographic head 100 is a Simox or bonded wafer having an insulating layer of silicon dioxide 162 separating single crystal silicon layers 164a and 164b. The torsion bars 104 are fabricated from the top single crystal silicon layer 164a of the substrate wafer. The torsion bars 104 and an upper portion of the central paddle 108 may be fabricated by etching from the top side of a substrate wafer with anisotropic or reactive ion etching. The intermediate silicon dioxide 162 provides a perfect etch stop and uniform thickness for the torsion bars 104. Etching the substrate wafer from the bottom side defines the central paddle 108 and the frame 102. Then, the silicon dioxide 162 is etched away freeing the central paddle 108 from the frame 102 except for the torsion bars 104. Alternatively, using a conventional silicon wafer the structure of the topographic head 100 may be etched first from the front, suitably protected, and then etched from the back with a timed etch to produce the same configuration as with the Simox or bonded wafer.

Referring to FIG. 5, after etching from the bottom side defines the central paddle 108, the frame 102 may completely surround and protect the central paddle 108. Subsequently, a portion 168 of the surrounding frame 102 may be removed by snapping it off along a groove 162 etched during fabrication of the torsion sensor 142. Removing the portion 168 yields a U-shaped frame 102 with the torsion bars 104 projecting inward from parallel arms of the frame 102. The central paddle 108 may have its length oriented along the [100] crystallographic direction of the substrate wafer thereby providing vertical walls for the central paddle 108. Alternatively, the length of the central paddle 108 may be oriented along the [110] crystallographic direction thereby producing walls of the central paddle 108 having an inclination of 54.7°. Artifacts at 45° resulting from [100] etching are readily accommodated by the structure of the topographic head 100.

In general, the voltage generated $\Delta V$ is described as $\Delta V = \pi_{44} \tau V$, where $\pi_{44}$ is the appropriate element of the piezoelectric tensor for n-type or p-type semiconductor material, $\tau$ the applied torsion stress, and V the voltage applied across the torsion sensor leads 144a and 144b. The voltage generated across the torsion sensor leads 144c and 144d can approach 20% of the applied voltage, and since it is typically generated within the low resistance sensor region 152, has very low noise. An alternating current ("AC") may be applied across a pair of torsion sensor pads 146 to the torsion sensor leads 144a and 144b which causes the electrical signal produced by the torsion sensor 142 on the torsion sensor leads 144c and 144d to become a modulation envelope of the applied AC thereby removing any direct current ("DC") offset. The output signal from the torsion sensor 142 on torsion sensor leads 144c and 144d is typically received by an instrumentation amplifier, not illustrated in any of the FIGS., that provides very good common mode rejection. An output signal produced by the instrumentation amplifier is proportional to deflection of the central paddle 108 with respect to the frame 102. The voltage generated by the torsion sensor 142 is, for all practical purposes, instantaneous, and therefore has very good frequency response.

As illustrated in FIG. 5a, during operation of the topographic head 100 the frame 102 typically is tilted slightly with respect to the surface 122 to avoid interference with the sample 123. The topographic head 100 is lowered until the tip 118 contacts the surface 122, which registers as a change in an output signal from the torsion sensor 142. This change in the output signal produced by the torsion sensor 142 may be regarded as a reference value for scanning the surface 122. As the topographic head 100 traverses across the surface 122, the output signal from the torsion sensor 142 changes in response to rotation of the central paddle 108 with respect to the frame 102 caused variations in the topography of the surface 122.

The central paddle 108, including the tip 118, is preferably balanced around the common axis 106 of the torsion bars 104. Such a configuration for the topographic head 100 minimizes deformation of the torsion bars 104 while also minimizing the output signal from the torsion sensor 142 when the torsion bar 104 is disposed in the rest plane 114. However, the width and length of the central paddle 108 on either side of the torsion bars 104 need not be identical. For ease of handling, one side 108a of the central paddle 108 may be short and stubby, while another side 108b may be elongated.

FIG. 8 depicts an alternative embodiment of the central paddle 108 depicted in FIG. 5. Those elements depicted in FIG. 8 that are common to the central paddle 108 depicted in FIG. 5 carry the same reference numeral distinguished by a prime (') designation. As illustrated in FIG. 8, the central paddle 108' surrounding a center 166 may be thinned significantly by anisotropic etching along the [110] or [100] crystallographic directions to reduce the mass of the central paddle 108, and to thereby improve the dynamic performance of the topographic head 100. Such thinning of the central paddle 108' about the center 166 may yield only a thin membrane spanning an outer frame of the central paddle 108' with the exception of a central bar 167. Moreover, the material surrounding the center 166 may be completely etched away leaving the central paddle 108' with only a hollow frame-shape and the central bar 167. Such a hollow frame structure is stiff, and reduces the load on torsion bars 104. Such profiles for the central paddle 108 are easily obtained with the SOI structure used in the preferred mode of fabrication.

The structure of the topographic head 100 as described thus far is adapted for use either in a profilometer or in an AFM. However, the tip 118 or tip 118', which may be attached on either side of the central paddle 108 or central paddle 108' as illustrated respectively in FIGS. 5a and 8a, will be different. In adapting the topographic head 100 for use in a profilometer, an anisotropic pit 168 may be etched in the central paddle 108 or 108' to receive the tip 118'. The tip 118 or tip 118' of a profilometer may be formed from diamond as is common, or any other suitable material. Alternatively, for an AFM the tip 118 or 118' may be formed on the central paddle 108 or 108' using the method described in U.S. Pat. No. 5,201,992 filed in the name of Robert Marcus et al. entitled "Method for Making Tapered Microminature Silicon Structures," which patent is incorporated herein by reference.

Capacitive Motion Sensing

FIG. 12 depicts an alternative embodiment topographic head similar to that depicted in FIG. 5a adapted for capacitively sensing topographic head movement. Those elements depicted in FIG. 12 that are common to the topographic head 100 depicted in FIG. 5a carry the same reference numeral distinguished by a triple prime (''') designation. In the embodiment depicted in FIG. 12, a pair of capacitor plates 182 are disposed on the same side of the central paddle 108''' similar to such capacitive sensing plates disclosed in a technical article entitled "The Interfacial-Force Microscope" by J. E. Houston and T. A. Michalske that was published on Mar. 19, 1992 in vol. 356 of *Nature* at pages 286–287. FIG. 13 depicts another alternative embodiment topographic head similar to that depicted in FIG. 5a that is also adapted for capacitively sensing head movement. Those elements depicted in FIG. 13 that are common to the topographic head 100 depicted in FIG. 5a carry the same reference numeral distinguished by a quadruple prime ('''') designation. In the embodiment depicted in FIG. 13, a pair of capacitor plates 184 are disposed on opposite sides of the central paddle 108''''. The capacitor plates 182 or 184 permit sensing motion of central paddle 108''' or 108''''. If the topographic head 100''' or 100'''' operates in a rocking or tapping mode, described in greater detail below, an electrical signal from the torsion sensor 142 may be fed-back to the planar coil 128 to induce oscillation of the central paddle 108''' or 108'''' at the frequency of the principal torsional vibrational mode of the central paddle 108''' or 108''''. For such a rocking or tapping operating mode, as is known in the art, the capacitor plates 182 or 184 permit sensing motion of the central paddle 108''' or 108''''.

Optical Motion Sensing

FIG. 14 depicts another alternative embodiment topographic head similar to that depicted in FIG. 5a that is adapted for optically sensing topographic head movement. Those elements depicted in FIG. 14 that are common to the topographic head 100 depicted in FIG. 5a carry the same reference numeral distinguished by a quintuple prime (''''') designation. In the embodiment depicted in FIG. 14, a reflective surface 186 is formed on the planar surface 112''''' of the central paddle 108''''' for reflecting a beam of light 188. As is well known in the art of AFM as illustrated by FIG. 2 of U.S. Pat. No. 5,412,980 filed in the names of Virgil B. Elings and John A. Gurley ("the '980 patent"), and by a technical article entitled "Scanning Force Microscope Springs Optimized for Optical-Beam Deflection and With Tips Made by Controlled Fracture" by M. G. L. Gustaffson, et al, published Jul. 1, 1994, in the Journal of Applied Physics, Vol. 76, No. 1, movement of the central paddle 108''''' may be sensed by movement of the reflected beam of light 188 across a surface of an optical detector, not illustrated in any of the FIGS.

XYZ Scanning Stage

The plan view of FIG. 15 depicts a preferred embodiment of a micromachined XYZ scanning stage in accordance with the present invention, referred to by the general reference character 200, that is adapted for use in an AFM. The XYZ scanning stage 200 includes an outer stage-base 202 that forms a perimeter of the XYZ scanning stage 200, and that is adapted to be held fixed within the system 20' with respect to the surface 122 to be scanned. The stage-base 202 is coupled to and supports an intermediate X-axis stage 204 through a plurality of flexures 206. The flexures 206 are arranged in pairs with one pair being located at the stage-base 202 and the other being located at the X-axis stage 204, the pair of flexures 206 being joined by an intermediate bar 208. Use of this structure for the flexures 206 implements the principle of the double compound linear spring described in a technical article by S. T. Smith et al. entitled "Design and Assessment of Monolithic High Precision Translation Mechanisms," that was published during 1987 in the Journal of Physics E: Scientific Instruments, vol. 20 at p. 977. An important characteristic of this arrangement for supporting the X-axis stage 204 with respect to the stage-base 202 is that there is there is no stretching of the flexures 206.

In the preferred embodiment of the XYZ scanning stage 200 depicted in FIG. 15, eight pairs of flexures 206, each coupled by the intermediate bar 208, join the stage-base 202 to the X-axis stage 204 to permit motion of the X-axis stage 204 laterally from side-to-side with respect to the stage-base 202. The X-axis stage 204 encircles, is coupled to and supports an inner Y-axis stage 212 by an arrangement of flexures 214 and intermediate bars 216 similar to that by which the stage-base 202 supports the X-axis stage 204. The flexures 214 and the intermediate bars 216 permit the Y-axis stage 212 to move laterally from side-to-side with respect to the X-axis stage 204. Thus compound lateral translation of the stage-base 202 with respect to the X-axis stage 204 and of the Y-axis stage 212 with respect to the X-axis stage 204 permits independent movement of the Y-axis stage 212 along mutually perpendiculary X and Y axes. The entire XYZ scanning stage 200, including the stage-base 202, the X-axis stage 204, the flexures 206, the intermediate bars 208, the Y-axis stage 212, the flexures 214 and the intermediate bars 216 are monolithically fabricated from a semiconductor single-crystal silicon layer of a substrate.

At least one of the flexures 206 and at least one of the flexures 214 includes a shear stress sensor 222 for sensing stress respectively in the flexure 206 or 214. FIGS. 16a and 16b are plan views depicting both the flexure 206 or the flexure 214 taken along the lines 16—16 in FIG. 15. The stress sensor 222 depicted in FIGS. 16a and 16b may be used to measure deflection of the flexures 206 and 214, and hence the stage deflection respectively along the X or Y axis. Even if longitudinal stresses appear in the flexures 206 and/or 214, the stress sensor 222 depicted in FIG. 16a is insensitive to such stresses, and properly indicates deflection along either the X or the Y axis. Since shear forces are greatest near the center of the flexures 206 and 214, the stress sensor 222, which in the illustration of FIG. 16a has a configuration similar to the torsion sensor 142 depicted in FIG. 6a, should be located on the flexure 206 or 214 as depicted in FIG. 16a.

In the stress sensor 222 depicted in FIG. 6a, a pair of shear-sensor current-leads 224 provide an electric current to the stress sensor 222, and a pair of shear-sensor sensing-leads 226 sense a voltage induced by shear stress in the flexure 206 or 214. The voltage present on the shear-sensor sensing-leads 226 is proportional to deflection of the flexure 206 or 214. The center axis 228 of the flexure 206 or 214 should be oriented in the [100] crystallographic direction for p-type silicon, and in the [110] crystallographic direction for n-type silicon. However, the stress sensor 222 may be fabricated either with the orientation depicted in FIG. 16a, or in an orientation rotated at 90° from that depicted in FIG. 16a. The stress sensor 222 requires no particular current isolation such as that required for the torsion sensor 142 since the shear stress is the same throughout the thickness of the flexure 206 or 214. Since the shear stress is greatest in the center of the flexure 206 or 214, current through the stress sensor 222 flows preferably along the center axis 228.

An alternative bending stress sensor 222 depicted in FIG. 16b employs a pair of piezo resistors 232 disposed symmetrically on opposite sides of the center axis 228. In such a piezo resistor implementation, bending of the flexure 206 or 214 compresses one piezo resistor 232 while stretching the other piezo resistor 232. However, piezo resistors 232 respond both to bending stresses of the flexure 206 or 214 and to tensile or compressive stress along the center axis 228, to which the stress sensor 222 depicted in FIG. 16a is insensitive. Use of the piezo resistors 232 in a differential mode reduces sensitivity of the piezo resistors 232 to tensile or compressive stress along the center axis 228, while responding preferentially to bending stress in the flexure 206 or 214. The stress sensor 222 depicted in FIG. 16b may also include additional piezo resistors 234, preferably removed from the area of bending stresses and/or oriented to be insensitive to bending stress, e.g. perpendicular to and symmetrically about the center axis 228. The piezo resistors 234 may be electrically incorporated into a resistance bridge together with the piezo resistors 232 to provide temperature compensation for the stress sensor 222.

The Y-axis stage 212 may support and translate along X and Y axes various different types of scanning sensors such an optical near-field microscope, a tunneling microscope, a field emission microscope, or a topographic head 100 such as that described above. The embodiment of the XYZ scanning stage 200 depicted in FIG. 15 illustrates, in greater detail in FIGS. 17a and 17b, the XYZ scanning stage 200 supporting a topographic head 100. As depicted in those FIGS., the Y-axis stage 212 includes a Z-axis stage 238 having a pair of torsion bars 242 that project inwardly from opposing sides of the Y-axis stage 212. The torsion bars 242 are aligned along a common axis 244 for supporting a Z-axis paddle 246 within the Y-axis stage 212. The torsion bars 242 and the Z-axis paddle 246 are monolithically fabricated from a semiconductor single-crystal silicon layer of a substrate together with the stage-base 202, X-axis stage 204, Y-axis stage 212, the flexures 206 and 214, and the intermediate bars 208 and 216. Similar to the central paddle 108 described above, the Z-axis paddle 246, which is supported within the Y-axis stage 212 for rotation about the common axis 244 of the torsion bars 242, defines a rest plane if no external force is applied to the Z-axis paddle 246. The Z-axis paddle 246 is rotatable about the common axis 244 of the torsion bars 242 to a rotational-position displaced from the rest plane by a force applied to the Z-axis paddle 246. The Z-axis paddle 246 may carry a topographic head 100 such as that described above and below adapted for AFM that projects outward from the Z-axis paddle 246 distal from the torsion bars 242. One of the torsion bars 242 of the Z-axis stage 238 includes a torsion sensor 249 fabricated identically to the torsion sensor 142 described above, and that has a structure and rotational sensing function identical to the torsion sensor 142. The electrical signal produced by the torsion sensor 249 measures Z-axis motion of the Z-axis paddle 246 with respect to the Y-axis stage 212.

In fabricating the XYZ scanning stage 200, wafers may be etched from both sides with mirrored image masks (carefully aligned) to increase the depth of the flexures 206 and 214, and their height to width aspect ratio. Bonded wafers may be used as substrates for fabricating the XYZ scanning stage 200. FIG. 17b illustrates the XYZ scanning stage 200 fabricated in this manner in which the silicon wafer consists of 2 bonded wafers 252a and 252b. The bonded wafers 252a and 252b are joined through an oxide layer 254 between them which acts as an etch stop. The use of bonded wafers 252a and 252b allows doubling the aspect ratio of the flexures 206 and 214 by etching from both sides either with wet etching or reactive ion etching. If the wall angle of the flexures 206 and 214 differs from 90°, then this procedure provides a symmetric shape for the flexures 206 and 214 which ensures distortion free lateral translation of the Y-axis stage 212 with respect to the stage-base 202.

Even higher aspect ratios may be achieved for the flexures 206 and 214 by identically etching several semiconductor wafers 262, illustrated in FIG. 18, that include lithographically fabricated alignment holes. After the semiconductor wafers 262 have been fabricated, they may be stacked one on top of the other as depicted in FIG. 18, preferably in pairs of two wafers facing back-to-back. The XYZ scanning stages 200 in each of the semiconductor wafers 262 may be bonded or glued together. If side walls of the flexures 206 and 214 slope as generally occurs if the semiconductor wafers 262 are prepared using anisotropic wet etching, then the etch direction for each pair of semiconductor wafers 262 preferably alternates so the overall stack is symmetric. Only one of the semiconductor wafers 262, i.e. an outer wafer 262, need include the torsion bars 242, Z-axis paddle 246 and the stress sensor 222.

In principal the X-axis stage 204 and the Y-axis stage 212 could be translated laterally with respect to the stage-base 202 by a pair of mutually orthogonal stepping-motor-controlled micrometer screw drives such as those described in the Teague et al. article, or by another type of push-rod mechanism. However, translation of the X-axis stage 204 and the Y-axis stage 212 is preferably effected using thin piezo electric transducers 272 illustrated in FIG. 15. One pair of such piezo electric transducers 272 is interposed between the stage-base 202 and the X-axis stage 204 on opposite sides of the X-axis stage 204. Similarly, a second pair of such piezo electric transducers 272 is interposed between the X-axis stage 204 and the Y-axis stage 212 on opposite sides of the Y-axis stage 212. The piezo electric transducers 272 may be located in pockets created in the stage-base 202 and in the stages 204 and 212, and may be operated in tandem from either side if so desired. The piezo electric transducers 272 have a very low mass and inertia while displacing the stages 204 and 212 sufficiently for AFM operation. Arranged in this way, the X-axis stage 204 must carry the piezo electric transducers 272 for displacing the Y-axis stage 212. However, these piezo electric transducers 272 are light, thus their mass does not significantly degrade the performance of the XYZ scanning stage 200.

The piezo electric transducers 272 may be provided either by thin piezo electric unimorph or bimorph disk or strip shaped plates 274 operating in the doming mode, preferably used in tandem. The piezo electric transducers 272 (either single or dual) consist preferably, as illustrated in FIG. 19, of 2 piezo plates 274, positioned face-to-face. The plates 274 may be fabricated from a thin circular disk of stress-biased lead lanthanum zirconia titanate ("PLZT") material. This material is manufactured by Aura Ceramics and sold under the "Rainbow" product designation. This PLZT unimorph provides a monolithic structure one side of which is a layer of conventional PLZT material. The other side of the PLZT unimorph is a compositionally reduced layer formed by chemically reducing the oxides in the native PLZT material to produce a conductive cermet layer. The conductive cermet layer typically comprises about 30% of the total disk thickness. Removing of the oxide from one side of the unimorph shrinks the conductive cermet layer which bends the whole disk and puts the PLZT layer under compression. The PLZT layer is therefore convex while the conductive cermet layer is concave.

Regardless of the particular material system used for the plates 274, applying a voltage across the plates 274 causes them either to increase or decrease their curvature. If the piezo electric transducer 272 on one side of a stage 204 or 212 increases the curvature of the plates 274 while the plates 274 in the piezo electric transducer 272 on the other side decreases its curvature the stage will move laterally with respect to the surrounding stage-base 202 or X-axis stage 204.

The plates 274 may preferentially be put in a clamshell arrangement as illustrated in FIG. 19. The plates 274 are surrounded by metal clamps 276, which may have an interior surface shaped to reduce stress by conforming to the curvature of the plates 274. The two metal clamps 276 are free to rotate with respect to each other, and are held together by a small spring or a hinge clasp 278. The metal clamps 276, which project upward above the upper surface of the XYZ scanning stage 200, include jaws 282 that contact adjacent edges of the stage-base 202 and the X-axis stage 204, or of the X-axis stage 204 and the Y-axis stage 212. Preferably the jaws 282 may be coated with plastic. The metal clamps 276 may include lips 284 for gluing the piezo electric transducers 272 in place to the stages 204 and 212. The plates 274 are lapped to a thickness which matches the space between adjacent edges of the stage-base 202 and the X-axis stage 204, or of the X-axis stage 204 and the Y-axis stage 212; the clamshell is then compressed and inserted between the stage-base 202 and the X-axis stage 204, or between the X-axis stage 204 and the Y-axis stage 212. The preload on the piezo electric transducers 272 must be carefully controlled. The maximum contraction of the plates 274 in response to an applied voltage must be smaller than the preload compression, or the plates 274 will get loose with consequent loss of control over lateral movement of the Y-axis stage 212.

While as illustrated in FIG. 15 the preferred embodiment of the XYZ scanning stage 200 preferably uses a pair of piezo electric transducers 272 for displacing the Y-axis stage 212 along each of the X and Y axes. Such a dual arrangement of plates 274 on opposite sides of the stages 204 and 212 advantageously provides transducer preload, without pronounced deflection of the stage. However, a XYZ scanning stage 200 in accordance with the present invention need only use a single piezo electric transducer 272 for effecting movement along the X axis or along the Y axis. In such a XYZ scanning stage 200 having only a single piezo electric transducer 272 per axis, each stage 204 and 212 must be preloaded against the piezo electric transducer 272 either by force generated within the flexures 206 and 214, or by a spring interposed between the stage-base 202 and the X-axis stage 204, and between the X-axis stage 204 and the Y-axis stage 212. These piezo electric transducers 272 can be inserted from the back of the XYZ scanning stage 200 so that the front is unencumbered and may be very close to the object to be scanned, if required.

To apply a force urging the topographic head 100 carried by the Z-axis paddle 246 toward a surface to be scanned, as illustrated in FIGS. 17a and 17b the XYZ scanning stage 200 includes a disk-shaped bimorph, unimorph or a Rainbow type, stress-biased PLZT piezo transducer 292 that contacts the Z-axis paddle 246. Upon application of a voltage to the piezo transducer 292, it deflects the cantilevered Z-axis paddle 246, thereby providing high frequency vertical motion along the Z-axis. The XYZ scanning stage 200 carrying the topographic head 100 may be used to measure the topography of the surface 122 in either of two different ways. In one mode of operation that may be identified as a constant force measurement, the electrical signal applied to the piezo transducer 292 maintains the signal from the the torsion sensor 142 included in the topographic head 100 at a constant value thereby causing the tip 118 of the topographic head 100 to apply a constant force to the surface 122. In this mode of operation, the signal from the torsion sensor 249 indicates the topography of the surface 122. In an alternative mode of operation the electrical signal applied to the piezo transducer 292 holds the topographic head 100 at a fixed location and the signal from the torsion sensor 142 indicates the topography of the surface 122.

Profilometer Head 100

The preceding description of the topographic head 100 is generic both to the topographic head 100 of a profilometer or of an AFM 20 or 20'. Adapting the topographic head 100 for use in a profilometer requires fabricating the topographic head 100 with a length of several mm for the central paddle 108 orthogonal to the common axis 106, a width of approximately 1–2 mm for the central paddle 108 parallel to the common axis 106, a thicknesses of tens of microns for the torsion bars 104, a width on the order of tens to hundreds of microns for the torsion bars 104, and lengths from a fraction of a mm to several mm for the torsion bars 104. A large variety of dimensions are possible, depending on the performance characteristics desired for the topographic head 100. A topographic head 100 having a length and width for the central paddle 108 of 9 mm and 1 mm respectively, and having a length, width and thickness for the torsion bars 104 of 1000, 600 and 20 microns respectively, has a principal torsional vibrational mode for the central paddle 108 about the common axis 106 of approximately 360 Hz, with the next higher vibrational mode at a frequency of approximately 2,366 Hz. A 10 A° displacement of the tip 118 for such a topographic head 100 readily produces a measurable signal from the torsion sensor 142. Much larger signals can be obtained from the torsion sensor 142 if the torsion bars 104 are made stiffer which, however, correspondingly increases the uncompensated force which the tip 118 applies to the surface 122.

AFM Head 100

An AFM topographic head 100, illustrated in FIGS. 9 and 9a, can also be fabricated in much the same way as the profilometer topographic head 100 using a SOI silicon wafer substrate, but the dimensions of the AFM topographic head are substantially different. Those elements depicted in FIGS.

9 and 9a depicting an AFM topographic head that are common to the topographic head 100 depicted in FIG. 5 carry the same reference numeral distinguished by a double prime (""") designation. For an AFM topographic head 100", the central paddle 108" typically has the same thickness as the torsion bars 104". The frame 102", central paddle 108", torsion bars 104", tip 118", torsion sensor 142", planar coil 128", and permanent magnet 124" are identical to the corresponding item for a profilometer except for being smaller in size. The torsion sensor 142 again produces an output signal representative of the topology of the surface 122" by recording rotation of central paddle 108" with respect to the frame 102" as the tip 118" traverses the surface 122". The tip 118" is now typically integrated into the central paddle 108" as illustrated in FIG. 9a, and is generally also made of silicon. The central paddle 108" now has the same thickness as the torsion bars 104 because AFM requires a much higher frequency response. The permanent magnet 124 may now be fixed on the other side of the frame 102" so as not to touch the substrate, but can also be much thinner. Typical dimension for an AFM topographic head 100" are: 100 and 200 microns for the length and width of the central paddle 108"; the torsion bars 104 are 150 microns long, 20 microns wide, 10 microns thick. Such a topographic head 100" has a principal torsional vibrational mode at approximately 275 kHz with the next higher vibrational mode at approximately 360 kHz, and a contact force of 2.3×10-8 Nt per A°. The stress generated in the torsion bars 104 is 4700 dynes/cm$^2$ for 1 A° deflection which produces a signal adequate for detection.

The topographic head 100" disclosed herein is extremely well suited for use in rocking or "tapping" mode AFM. In the tapping mode AFM, such as that described in the '980 patent, the tip 118" is first made to oscillate with a controlled small amplitude while not contacting the surface 122, and is then brought into contact with the surface 122 thereby reducing the amplitude of the oscillation. A force diagram in FIG. 10 schematically illustrates both a cantilever vertical tapping mode 172, indicated by a double headed arrow in FIG. 10, and a vertical servo motion 174 of the AFM sensing head, also illustrated by a double headed arrow in FIG. 10. In the force diagram of FIG. 10, the cantilever vertical tapping mode 172 and the vertical servo motion 174 are cross coupled. Conversely, as illustrated in the force diagram of FIG. 11, the central paddle 108" described herein does not couple the vertical servo motion 174 to the signal from the torsion sensor 142. Consequently, as indicated in FIG. 10 there is no cross-coupling between the vertical servo motion 174 and the tapping or rocking of the central paddle 108". The motion of the balanced central paddle 108" is not affected by vertical servo displacements, while the cantilever illustrated by FIG. 10 is affected by vertical servo displacements which is undesirable.

Typical dimensions for an AFM rocking mode topographic head 100" are: central paddle 108" length 500 microns, thickness 20 microns, width 200 microns; torsion bar 104 length 100 microns, width 50 microns and thickness 20 microns. The resonance frequency for the principal torsional vibrational mode of the central paddle 108" is then approximately 250 kHz. In the rocking mode of AFM operation, current supplied to the planar coil 128 keeps the amplitude of the signal from the torsion sensor 142" constant though use of a feedback circuit to supply current to the planar coil 128", after suitable amplification. The central paddle 108" is made self-oscillating at its principal torsional vibrational frequency by feeding back the signal from the torsion sensor 142" to the planar coil 128". Preferably, this alternating current passing through planar coil 128 causes the central paddle 108" to oscillate at its principal torsional vibrational mode, with a small amplitude of oscillation (several tens to hundreds of A°) at the tip 118". As described previously, the entire topographic head 100" is then servoed vertically with the sensing head 26' to keep the amplitude of torsional oscillation constant as the tip 118" contacts the surface 122". Accordingly, in such a rocking mode AFM the vertical servo signal becomes the output signal that represents the topology of the surface 122". The small size of the topographic head 100", and its high degree of integration, adapts the topographic head 100" for very fast scanning. For the rocking mode AFM topographic head 100' described above, a 1 A° change in oscillation amplitude can be observed with a 22 dB S/N ratio.

Other Uses for Topographic head 100

The profilometer and AFT configuration of the topographic head 100 described above can also be used as a micro-indentor for evaluating the properties of various thin coatings. To use the topographic head 100 as a micro-indentor, the tip 118 is positioned in contact with the substrate, a calibrated pulse of current is sent through planar coil 128, and impact force of the tip 118 indents surface 122 of the sample 123. The indented area of the sample 123 may then be scanned to measure the indentation formed in the surface surface 122.

XY Scanning Stage 200

A XYZ scanning stage 200 in accordance with the present invention may be fabricated having an outer dimension of 35×27 mm for the stage-base 202 while the inner Y-axis stage 212 is 5×5 mm. Each pair of flexures 214 and intermediate bars 216 is 3 mm long, 600 micron wide, 800 micron thick, and the thinnest part of the flexure 214 is 100 microns wide. The lowest resonance frequencies in such a system are all above 3000 Hz. Displacements of the Y-axis stage 212 along the X and Y axes may typically be 50 microns, and the Z axis displacement a few microns.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A micromachined XY scanning stage comprising:

an outer stage-base that is adapted to be held fixed with respect to a surface to be scanned;

an intermediate X-axis stage that is coupled to and supported from the stage-base by a plurality of flexures, at least one of the flexures coupling between said stage-base and said X-axis stage having a shear stress sensor formed therein for sensing stress in that flexure;

an inner Y-axis stage that is coupled to and supported from the X-axis stage by a plurality of flexures, at least one of the flexures coupling between said X-axis stage and said Y-axis stage having a shear stress sensor formed therein for sensing stress in that flexure; said stage-base, X-axis stage, Y-axis stage, and flexures all being monolithically fabricated from a semiconductor single-crystal silicon layer of a substrate; and sensing means supported by, and carried for X-axis and Y-axis translation by, said X-axis stage and Y-axis stage.

2. The XY scanning stage of claim 1 wherein said sensing means adapts the XY scanning stage for sensing topography of a surface, said sensing means including:

a Z-axis stage having torsion bars that project inwardly from opposing sides of said Y-axis stage and are aligned along a common axis for supporting a Z-axis paddle within said Y-axis stage; said torsion bars and Z-axis paddle being monolithically fabricated from a semiconductor single-crystal silicon layer of a substrate together with said stage-base, X-axis stage, Y-axis stage, and flexures; said Z-axis paddle being supported within the Y-axis stage for rotation about the common axis of the torsion bars, defining a rest plane if no external force is applied to said Z-axis paddle, and being rotatable about the common axis of said torsion bars to a rotational-position displaced from the rest plane by a force applied to said Z-axis paddle; said Z-axis paddle being adapted for carrying a scanning sensor;

drive means for urging to said Z-axis paddle to rotate about the common axis of said torsion bars; and rotational-position sensing means for measuring the rotational-position of said Z-axis paddle about the common axis of said torsion bars.

3. The XY scanning stage of claim 2 wherein the scanning sensor carried by said Z-axis stage is a micromachined topographic head adapted for use in sensing topography of a surface, the topographic head including:

a frame from which inwardly project opposing torsion bars that are aligned along a common axis and that support a central paddle within said frame; said frame, torsion bars and central paddle all being monolithically fabricated from a semiconductor single-crystal silicon layer of a substrate; said central paddle being supported within the frame for rotation about the common axis of the torsion bars, having a center, defining a rest plane if no external force is applied to said central paddle, and being rotatable about the common axis of said torsion bars to a rotational-position displaced from the rest plane by a force applied to said central paddle; said central paddle including a tip that projects outward from said central paddle distal from said torsion bars, the tip being adapted for juxtaposition with a surface for sensing the topography thereof;

drive means for urging to said central paddle to rotate about the common axis of said torsion bars; and rotational-position sensing means for measuring the rotational-position of said central paddle about the common axis of said torsion bars.

4. The XY scanning stage of claim 2 wherein said drive means is a laminated metal unimorph that is coupled to said Z-axis paddle.

5. The XY scanning stage of claim 2 wherein said drive means is a bimorph that is coupled to said Z-axis paddle.

6. The XY scanning stage of claim 2 wherein said drive means is formed from stress-biased PLZT material of a Rainbow type of ceramic which has been processed so one side surface thereof has been compositionally reduced to obtain a material having a cermet composition, whereby the drive means constitutes a monolithic unimorph, the unimorph being coupled to said Z-axis paddle.

7. The XY scanning stage of claim 1 wherein the shear stress sensor includes a piezo sensor.

8. The XY scanning stage of claim 1 wherein the shear stress sensor includes a piezo resistor.

9. The XY scanning stage of claim 1 further comprising X-axis drive means.

10. The XY scanning stage of claim 9 wherein said X-axis drive means is interposed between said outer stage-base and said intermediate X-axis stage.

11. The XY scanning stage of claim 9 wherein said X-axis drive means is a piezo transducer interposed between said outer stage-base and said intermediate X-axis stage.

12. The XY scanning stage of claim 11 wherein said piezo transducer is a laminated metal unimorph.

13. The XY scanning stage of claim 11 wherein said piezo transducer is a bimorph.

14. The XY scanning stage of claim 11 wherein said piezo transducer is formed from stress-biased PI, ZT material of a Rainbow type of ceramic which has been processed so one side surface thereof has been compositionally reduced to obtain a material having a cermet composition, whereby the piezo transducer constitutes a monolithic unimorph.

15. The XY scanning stage of claim 1 further comprising Y-axis drive means.

16. The XY scanning stage of claim 15 wherein said Y-axis drive means is interposed between said intermediate X-axis stage and said inner Y-axis stage.

17. The XY scanning stage of claim 15 wherein said Y-axis drive means is a piezo transducer interposed between said intermediate X-axis stage and said inner Y-axis stage.

18. The XY scanning stage of claim 17 wherein said piezo transducer is a laminated metal unimorph.

19. The XY scanning stage of claim 17 wherein said piezo transducer is a bimorph.

20. The XY scanning stage of claim 17 wherein said piezo transducer is formed from stress-biased PLZT material of a Rainbow type of ceramic which has been processed so one side surface thereof has been compositionally reduced to obtain a material having a cermet composition, whereby the piezo transducer constitutes a monolithic unimorph.

\* \* \* \* \*